US012750432B2

(12) United States Patent
Lonkar et al.

(10) Patent No.: US 12,750,432 B2
(45) Date of Patent: Sep. 29, 2026

(54) FAILURE RETRY ORDER IN RESPONSE TO A NETWORK FUNCTION DISCOVERY REQUEST

(71) Applicant: T-Mobile USA, Inc., Bellevue, WA (US)

(72) Inventors: Shon Anil Lonkar, Maple Valley, WA (US); Ryan J. McGinn, Shawnee, KS (US); Anthony C. Wells, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 224 days.

(21) Appl. No.: 18/646,696

(22) Filed: Apr. 25, 2024

(65) Prior Publication Data

US 2025/0337819 A1 Oct. 30, 2025

(51) Int. Cl.
*H04L 67/60* (2022.01)
*H04L 41/0663* (2022.01)

(52) U.S. Cl.
CPC .......... *H04L 67/60* (2022.05); *H04L 41/0663* (2013.01)

(58) Field of Classification Search
None
See application file for complete search history.

(56) References Cited

U.S. PATENT DOCUMENTS 5,915,008 A * 6/1999 Dulman ............... H04Q 3/0033 709/200
10,772,062 B1 * 9/2020 Albasheir ......... H04W 28/0846
11,271,846 B2 3/2022 Krishan
11,570,262 B2 1/2023 Sapra et al.
11,659,024 B2 5/2023 Yang
11,855,956 B2 12/2023 Krishan et al.
11,924,294 B2 3/2024 Rodrigo et al.
11,929,882 B2 3/2024 Turina et al.
12,069,126 B2 * 8/2024 Rodrigo ................ H04L 67/561
12,381,791 B2 * 8/2025 Mullally ............. H04L 41/5051
12,407,561 B2 * 9/2025 Das ....................... H04L 67/561
2011/0138053 A1 * 6/2011 Khan ...................... G06F 9/505 709/226
2019/0280873 A1 * 9/2019 Yang ..................... H04L 9/3239
2020/0028921 A1 * 1/2020 Cai ......................... H04L 67/60

(Continued)

FOREIGN PATENT DOCUMENTS

KR 102435830 B1 8/2022
WO WO-2013158920 A1 * 10/2013 ............ H04L 45/72

(Continued)

*Primary Examiner* — Sandarva Khanal

(74) *Attorney, Agent, or Firm* — Ashurst Perkins Coie US LLP

(57) ABSTRACT

The disclosed technology configures a Network Repository Function (NRF) of a wireless communication network to include a Network Function (NF) retry order in a list of producer network nodes capable of providing a service to a consumer network node that is provided in response to a discovery request by the consumer network node. Upon receiving the discovery node, the NRF identifies producer network nodes capable of providing a service to the consumer network node and sends information about the list of producer network nodes with a retry order specifying an order of producer network nodes for retrying a service request upon a failure of an initial service request.

17 Claims, 7 Drawing Sheets

(56) References Cited

U.S. PATENT DOCUMENTS

2020/0195521 A1* 6/2020 Bogineni .............. H04W 36/26
2020/0267785 A1* 8/2020 Talebi Fard ........ H04W 40/248
2022/0052992 A1* 2/2022 Zhang ................... H04W 12/06
2022/0124162 A1 4/2022 Zhang et al.
2022/0191028 A1* 6/2022 Aggarwal ............. H04L 9/3213
2022/0240172 A1 7/2022 Hallenstål
2023/0137034 A1 5/2023 Jost
2023/0155832 A1 5/2023 Aggarwal et al.
2023/0262459 A1* 8/2023 Li ....................... H04W 12/069 455/410
2023/0269137 A1* 8/2023 Fehring ............... H04L 67/1097 709/220
2023/0269608 A1* 8/2023 Puente Pestaña ..... H04W 24/02 370/252
2023/0275974 A1 8/2023 Rodrigo et al.
2023/0283470 A1 9/2023 Rodrigo et al.
2023/0396655 A1 12/2023 Rodrigo et al.
2024/0015232 A1 1/2024 Rodrigo
2024/0064197 A1 2/2024 Rodrigo et al.
2024/0064211 A1 2/2024 Karapantelakis et al.
2024/0064212 A1 2/2024 Rodrigo
2024/0073786 A1* 2/2024 Lu ......................... H04W 48/04
2024/0397412 A1* 11/2024 Kaki ..................... H04W 48/14

FOREIGN PATENT DOCUMENTS

WO WO-2019162862 A1 * 8/2019 ............ H04W 24/04
WO WO-2020023243 A1 * 1/2020 ............ H04W 48/16
WO 2021188023 A1 9/2021
WO 2021233646 A1 11/2021
WO WO-2022022909 A1 * 2/2022 ............. H04L 67/51
WO WO-2022066078 A1 * 3/2022 ............ H04W 24/04
WO 2023052596 A1 4/2023
WO WO-2024198970 A2 * 10/2024 .............. H04W 8/00

* cited by examiner

FAILURE RETRY ORDER IN RESPONSE TO A NETWORK FUNCTION DISCOVERY REQUEST

BACKGROUND

In telecommunications, 5G is the fifth-generation technology standard for cellular networks in which a service area is divided into small geographical areas called cells. The 5G wireless devices in a cell communicate by radio waves with a cellular base station via fixed antennas, over frequencies assigned by the base station.

A 5G network is based on a service-based architecture (SBA), which implements IT network principles and a cloud-native design approach. The core network functions (NFs) of the 5G network are refactored into individual micro-services coming together to automatically discover each other and utilize services offered by each other.

BRIEF DESCRIPTION OF THE DRAWINGS

Detailed descriptions of implementations of the present invention will be described and explained through the use of the accompanying drawings.

Figure 1:
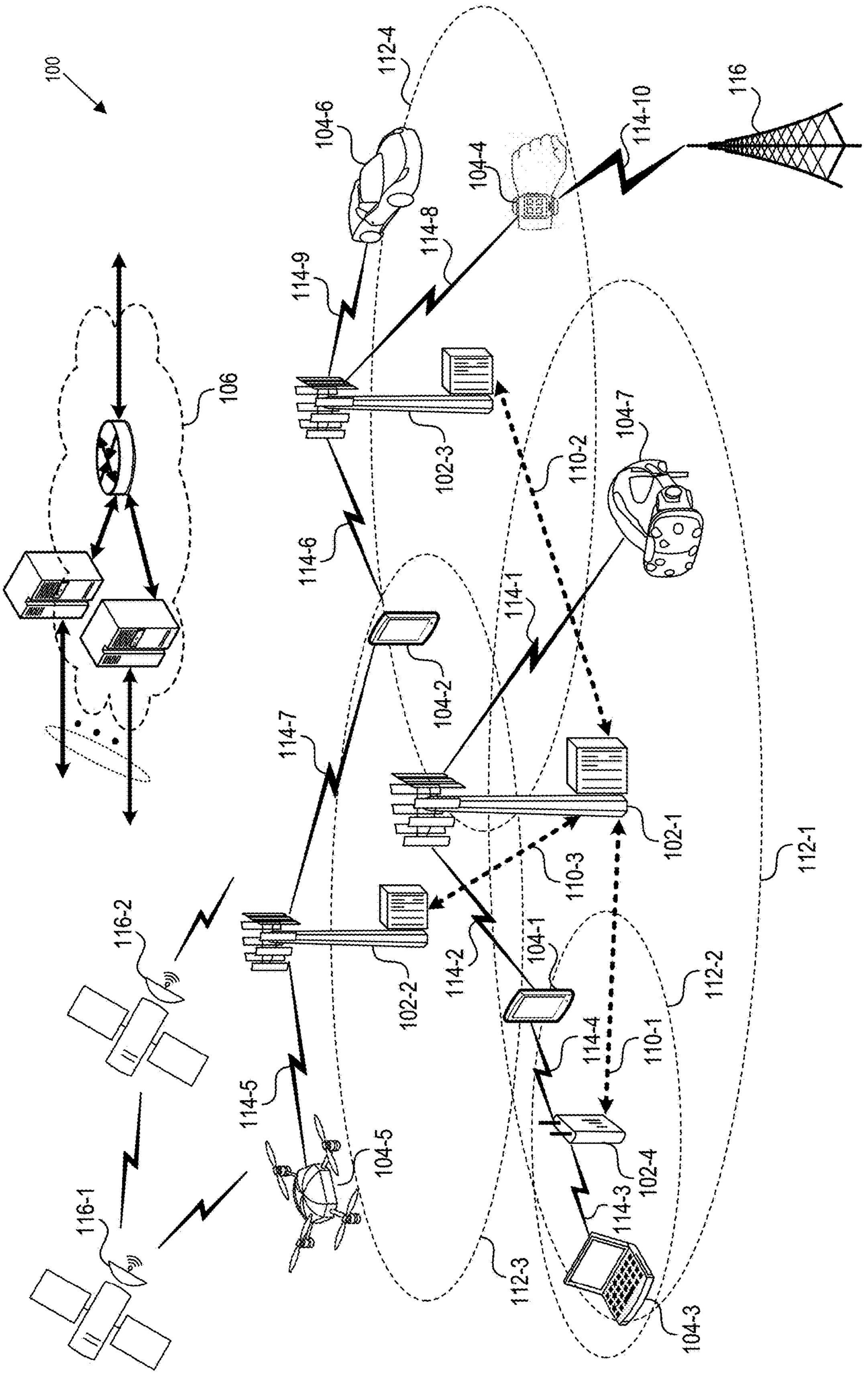
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In a 5G network, an SBA breaks up the core functionality of the 5G network into interconnected NFs, which are typically implemented as cloud-native NFs. The NFs register with a network repository function (NRF) that maintains the states of the NFs. The NFs communicate with each other using the Service Communication Proxy (SCP). The NFs are refactored into individual micro-services, each of which is capable of having multiple instances. With the increasing number of such micro-services, the complexity of service-to-service communications is further increased.

The NRF is a central registry which holds information about every NF in the 5G network. One of the functions of the NRF is service discovery, which is a process of identifying an instance of a service within the 5G network that is capable of fulfilling a service request. Currently, upon receipt of a discovery request associated with the service request from a consumer NF, the NRF checks a database and identifies a list of available service producers from NFs registered with the NRF based on parameters specified by the consumer NF. The consumer NF then sends the service request to an instance of a producer NF identified in the list of available service producers to establish a session. There may be situations in which the instance of the producer NF is unavailable, resulting in failure, error, or timeout of the service request. In such situations, because the NRF in current 5G networks does not provide a retry order for the consumer NF, the consumer NF may retry sending the service request to the same instance of the producer NF, sending the service request to another instance of the producer NF that has similar geo-locality causing the failure, or terminating the service request.

The disclosed technologies address the challenges faced by the consumer NF in current 5G networks by configuring the NRF to include an NF retry order in the list of available service producers such that the consumer NF is able to identify a retry instance of an identified producer NF that is highly likely to succeed in the retry upon a failure of an initial service request to an instance of the identified producer NF. The NF retry order is determined based on one or more factors including at least one of: latency associated with each instance of the producer NF, preference not to retry to the initial instance of the producer NF, capacity associated with each instance of the producer NF, and/or geographic location associated with each instance of the producer NF. Based on the list of available service producers including the NF retry order, the consumer NF can avoid exhaustively trying instances that result in failures.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL)

transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
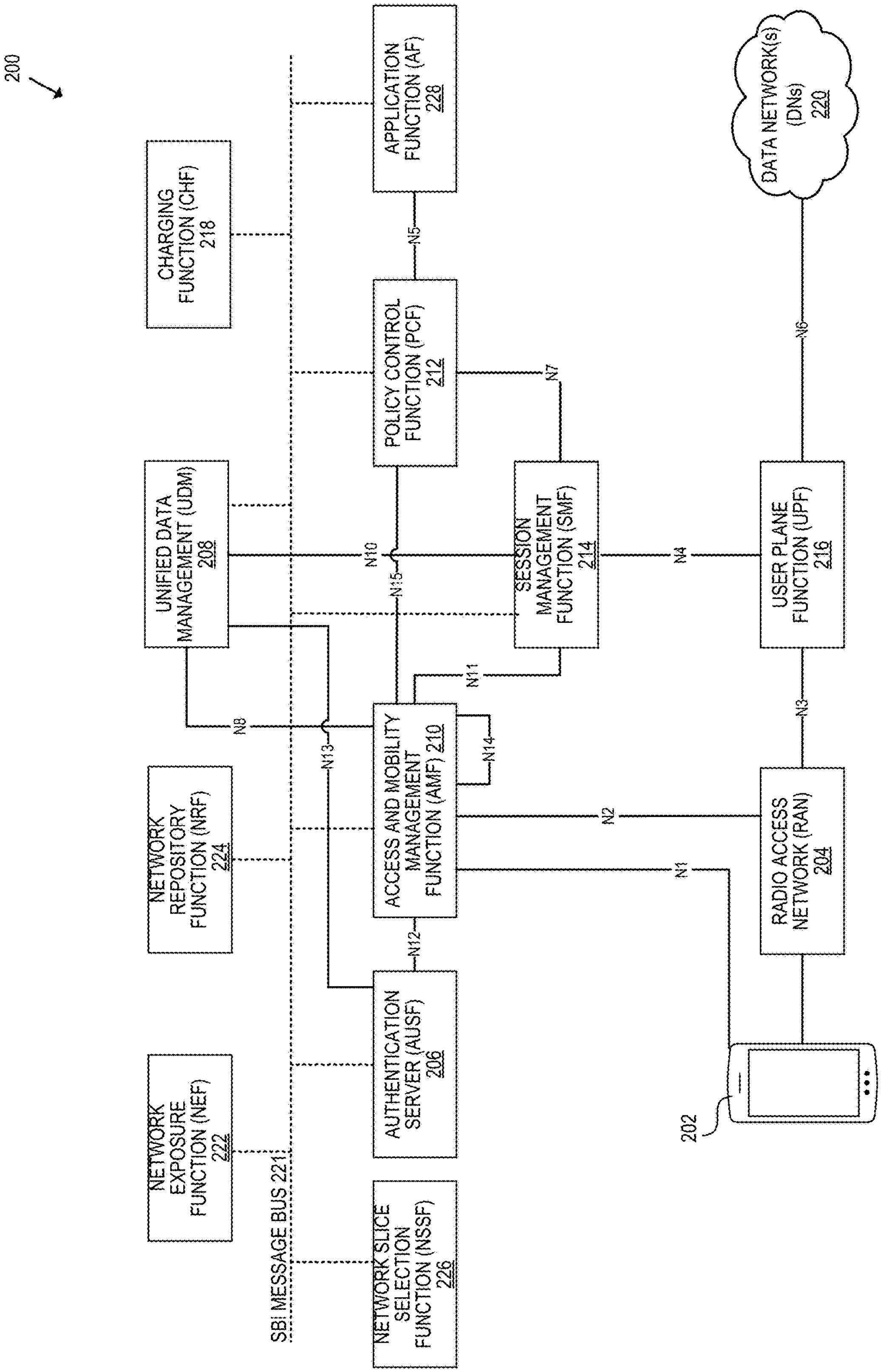
FIG. 2 is a block diagram that illustrates 5G core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in an SBA through a Service Based Interface (SBI) 221 that uses HTTP/2. The SBA can include a Network Exposure Function (NEF) 222, a Network Repository Function (NRF) 224, a Network Slice Selection Function (NSSF) 226, and other functions such as an SCP.

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Failure Retry Order in Response to a Network Function Discovery Request

Figure 3:
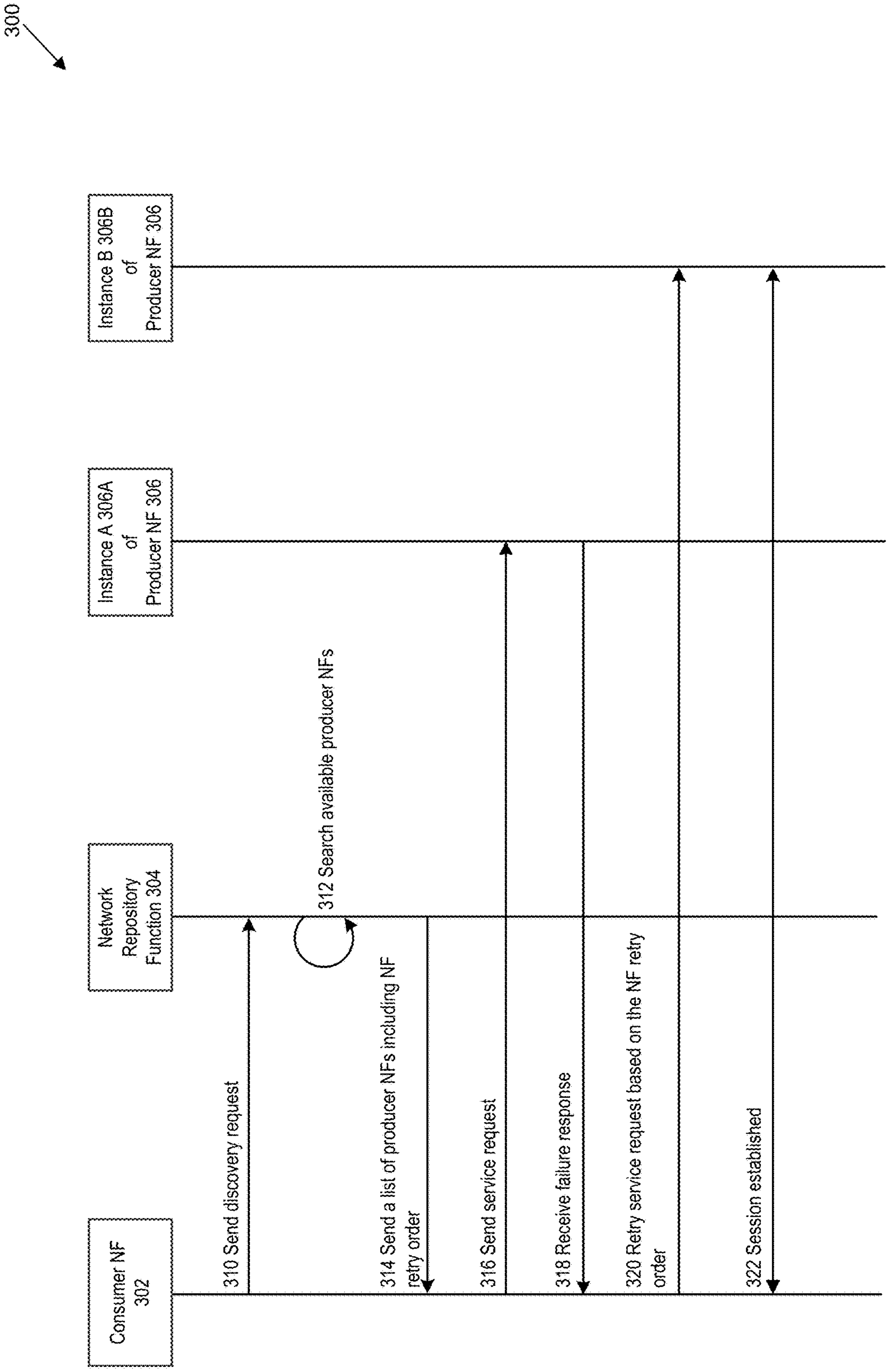
FIG. 3 is a flowchart representation of an example signaling sequence between a consumer NF and a producer NF in a wireless communication network in accordance with one or more embodiments of the present technology.

As discussed above, the NRF is the central registry that holds information about every NF in the 5G network. As the NRF determines suitable NF(s) to fulfill a certain service request, the NRF is also in the position to determine the best alternative NF instances, and the order thereof to retry using the alternative instances, should the initially assigned NF instance encounter a failure. FIG. 3 is a flowchart representation of an example signaling sequence 300 between a consumer NF 302 and a producer NF 306 in a wireless communication network in accordance with one or more embodiments of the present technology. In this example, a service request is sent based on a list of producer NFs capable of providing a service received by the consumer NF 302 after sending a discovery request to an NRF 304. At Operation 310, the consumer NF 302 sends a discovery request to the NRF 304 to identify a producer NF capable of providing a service to the consumer NF 302. The discovery request can include information associated with the service the consumer NF 302 plans to request, e.g., parameters defined by the consumer NF 302, locality information associated with the consumer NF 302, or network slice information associated with the consumer NF 302.

At Operation 312, the NRF 304 searches a database to identify producer NFs capable of providing the service to the consumer NF 302. The database stores NF profiles of NFs in the wireless communication network. Upon receiving the discovery request from the consumer NF 302, the NRF 304 begins searching for producer NFs that satisfy the parameters defined by the consumer NF 302 in the discovery request. Upon identifying the producer NFs capable of providing the service to the consumer NF 302, the NRF 304 can generate a list of the producer NFs. In particular, producer NFs identified in the list of the producer NFs are associated with a retry order identifying an order of retrying a request for the service upon failure of an initial request for the service by the consumer NF 302. The specific retry order by the NRF, based on factors such as a latency associated with each of the producer NFs identified in the list, provides a higher likelihood of successfully establishing a connection between the NFs with minimal retry overhead, should the initial communication attempt(s) fail. In other implementations, the retry order is further based on factors such as capacity information of instances of the producer NFs identified in the list or geo-location of the instances of the producer NFs identified in the list. At Operation 314, the NRF 304 sends the list of the producer NFs including the retry order information.

At Operation 316, the consumer NF 302, using the list of the producer NFs received from the NRF 304, sends a service request to instance A 306A of producer NF 306 identified in the list. A session is successfully established if the instance A 306A accepts the service request and sends a corresponding response to the consumer NF 302. However, in some cases, the instance A 306A of the producer NF 306 is unavailable to accept the service request. Operation 318 describes a situation in which the consumer NF 302 receives a failure response from the unavailable instance A 306A. The failure response can include error codes (e.g., 400 client error codes or 500 server error codes) indicating a source of error that resulted in request failure.

At Operation 320, after receiving the failure response from the instance A 306A of the producer NF 306 indicating the instance A 306A is unavailable, the consumer NF 302 reviews the list of the producer NFs received from the NRF 304. Using the retry order information included in the list of the producer NFs to identify another instance of the producer NF 306, the consumer NF 302 can send a service request to the instance B 306B of the producer NF 306. Because the retry order is specified by the NRF, the consumer NF 302 does not need to obtain information about the producer NFs, such as the load information of the producer NFs and/or specific locality information about the NFs. The consumer NF 302 can simply rely on the order that is determined based on the NRF's knowledge about the NFs and achieve a higher retry success rate.

At Operation 322, a session between the consumer NF 302 and the instance B 306B of the producer NF 306 is successfully established upon accepting of the service request by the instance B 306B. The instance B 306B of the producer NF 306 subsequently sends a corresponding response to the consumer NF 302.

The consumer NF 302 can be any of the NFs in the wireless communication network that initiates a service request to another NF in the wireless communication network. For example, the consumer NF 302 can be an SMF looking to perform online charging. The SMF begins by sending a discovery request to identify CHFs in the wireless communication network capable of performing online charging for the SMF. The discovery request can include identifying information, e.g., type of service request being made by the SMF, that the service being requested is online charging, locality information associated with the SMF, and/or desired parameters for the CHF. Upon receiving the discovery request from the SMF, the NRF searches a database of NF profiles to identify CHFs capable of performing online charging for the SMF.

After identifying the CHFs capable of performing online charging for the SMF, the NRF can be configured to determine a retry order identifying an order of retrying a request for performing online charging by the SMF upon failure of an initial request by the SMF. The NRF can assign different retry orders to each instance of the identified CHFs. The retry order can be based on latency associated with each instance of the identified CHFs. In some implementations, the retry order can further be based on geo-location of each instance of the identified CHFs or capacity information associated with each instance of the identified CHFs.

Based on the search of capable CHFs and determination of the retry order, the NRF can send a list of identified CHFs with retry order information to the SMF. Upon receiving the list, the SMF sends a service request to an instance of a CHF identified in the list to perform online charging. If the initial service request fails, the SMF can send a service request to another instance of the CHF based on the retry order information included in the list of identified CHFs.

Figure 4:
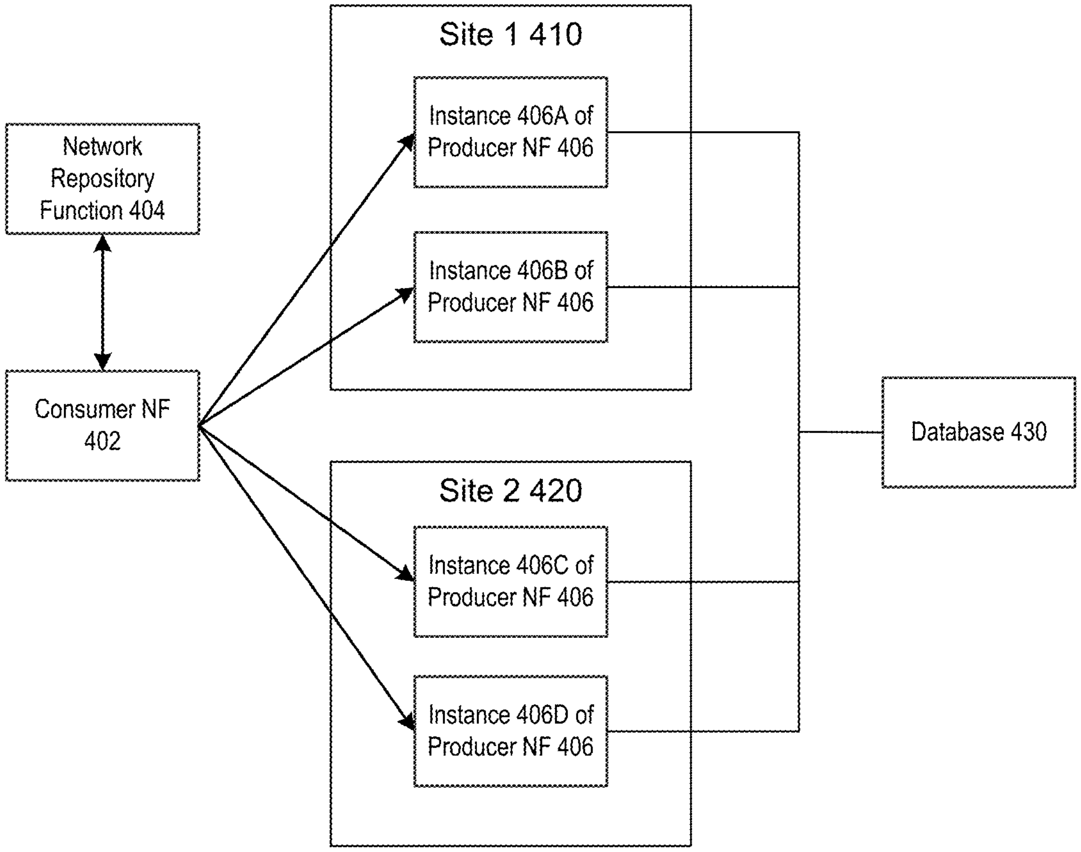
FIG. 4 is a block diagram that illustrates a service request made by a consumer NF based on a list of producer NFs capable of handling the service request and a retry order received from a network repository function (NRF).

FIG. 4 is a block diagram that illustrates a service request made by a consumer NF 402 based on a list of producer NFs capable of handling the service request and a retry order received from an NRF 404. Upon receiving a list of producer NFs capable of handling the service request, the consumer NF 402 can initiate a service request to instance 406A of producer NF 406. As shown in FIG. 4, the producer NF 406 is in a multi-endpoints configuration and includes four instances 406A-D. Each instance of the producer NF 406 is part of an NF set capable of handling the service request by the consumer NF 402 because instances of the producer NF 406 in the NF set share a database 430. The instances of the producer NF 406 can be divided into multiple sites, such that Site 1 (410) includes instances 406A and 406B, whereas Site 2 (420) includes instances 406C and 406D.

In an example, the consumer NF 402 sends a service request to instance 406A of the producer NF 406 and receives a failure response indicating the instance 406A is unavailable to provide the service. Upon such failure, the consumer NF 402 can retry sending the service request to another instance of the producer NF 406 which is available to provide the service to the consumer NF 402. The list of producer NFs capable of handling the service request corresponds to a retry order associated with each instance of the producer NF 406. For example, the retry order indicates an instance 406C that has a high likelihood of successfully establishing a connection. Based on the retry order, the consumer NF 402 sends a subsequent service request to instance 406C such that a connection can be established successfully with minimal retry overhead.

In some implementations, the instances of the producer NF 406 are categorized into NF sets. In some embodiments, instances within the same NF set are located, or considered to be co-located, in the same site. For example, the NRF 404 can identify instances 406A and 406B as part of NF set 1 and instances 406C and 406D as part of NF set 2. The NRF 404 can determine, based on its knowledge of the NFs, that if the initial request for service to instance 406A fails, Site 1 (410) can be problematic for establishing connections for such service. Accordingly, the NRF 404 can specify a retry order indicating that instances 406C and 406D are preferred retry instances by deliberately avoiding possible errors or failures caused by Site 1 (410). Such retry order provided by the NRF 404 can result in higher likelihood of establishing a successful retry after failure of an initial request by the consumer NF 402. Using the retry order information received from the NRF 404, the consumer NF 402 can retry sending the service request to instance 406C or 406D of the NF set 2 before retrying to instance 406B, so as to increase the success rate of retry and reduce any overhead cost associated with the retry process.

In some implementations, the NRF 404 can group instances of the producer NF 406 based on latency associated with each instance of the producer NF 406. For example, the NRF 404 can identify instances 406B and 406C as NF set 1 and instance 406D as part of NF set 2, based on determining that instances 406B and 406C are associated with low latency and instance 406D is associate with high latency. The NRF 404 can set a predetermined threshold for latency to group the instances. Instances with latency below the predetermined threshold can be identified as part of NF set 1, and instances with latency above the predetermined threshold can be identified as part of NF set 2.

Alternatively or additionally, the grouping of instances of the producer NF 406 by the NRF 404 is based on a CPU utilization associated with each instance of the producer NF 406. Instances with CPU utilization above the threshold are less likely to establish a successful retry after failure of an initial request by the consumer NF 402 as compared to instances with CPU utilization below the threshold. The NRF 404 can set a CPU utilization threshold such that instances with CPU utilization below the threshold are identified as part of NF set 1, and instances with CPU utilization above the threshold are identified as part of NF set 2. In some implementations, the NRF 404 dynamically updates the retry order based on one or more factors including, but not limited to, thresholds associated with latency or CPU utilization of each instance of the producer NF 406.

Figure 5:
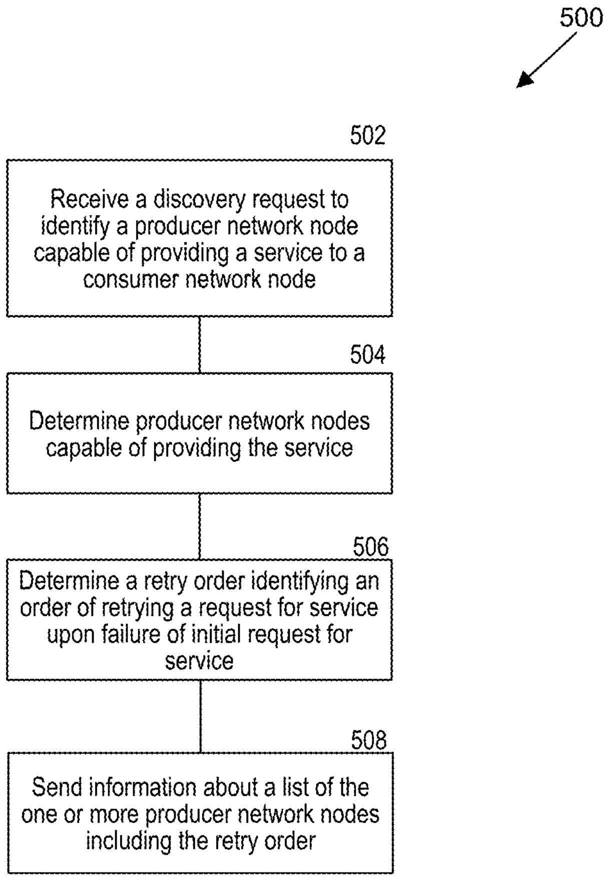
FIG. 5 is a flowchart representation of an example process for identifying a list of producer NFs including a retry order in accordance with one or more embodiments of the present technology.

FIG. 5 is a flowchart representation of an example process 500 for identifying a list of producer NFs including a retry order in accordance with one or more embodiments of the present technology. Other implementations of the process 500 include additional, fewer, or different steps or performing the steps in different orders.

At Operation 502, an NRF of a wireless communication network receives a discovery request from a consumer network node to identify a producer network node capable of providing a service. The discovery request identifies parameters defined by the consumer network node and can include information of the service request by the consumer network node, locality information associated with the consumer network node, or network slice information associated with the consumer network node. The consumer network node can be any network node in the wireless communication network that can communicate with and make a service request to other network nodes in the wireless communication network. For example, the consumer network node is an SMF making a request to a CHF to perform online charging. In another example, the consumer network node is a PCF making a subscribe request to a CHF. As explained in the examples, a network node serving as a consumer network node in one example process can serve as a producer network node that provides a service to another network node in another example process.

At Operation 504, in response to the discovery request, the NRF determines producer network nodes capable of providing the service to the consumer network node. The producer network nodes are identified by accessing a database that includes profiles of network nodes in the wireless communication network.

At Operation 506, the NRF determines a retry order identifying an order of retrying a request for service upon failure of an initial request for service. The NRF can be configured to identify a retry order for at least one producer network node such that the retry order indicates another producer network node to retry the request for service. In some implementations, the producer network nodes identified by the NRF are associated with multiple instances, each instance associated with a single producer network node belonging to a same network node group. In other implementations, instances associated with the producer network node belongs to different network node groups. The NRF can be configured to identify, for each instance of the producer network node identified by the NRF, the retry order that specifies another instance or a group of instances of the producer network node to retry the request for service upon failure of an initial request for service. In some implementations, the NRF is configured to assign the multiple instances of the identified producer network node into different retry groups. The different retry groups are defined by the NRF to indicate a preferred retry group of instances to retry to in an event of request failure associated with a given instance of the identified producer network node. Assignment of the retry groups can be based at least on a latency associated with each instance of the multiple instances.

At Operation 508, the NRF sends information about a list of producer network nodes capable of providing the service to the consumer network node. The list can include a number of instances associated with each of the producer network nodes and the retry order identifying an order of retrying a request for service upon failure of an initial request for service. For example, in response to a discovery request by an SMF to identify CHFs capable of providing online charging services for the SMF, the NRF sends a list of CHFs to the SMF. The list of CHFs can include information such as network node group information, retry group information, and retry order information associated with each instance of the CHFs in the list.

Figure 6:
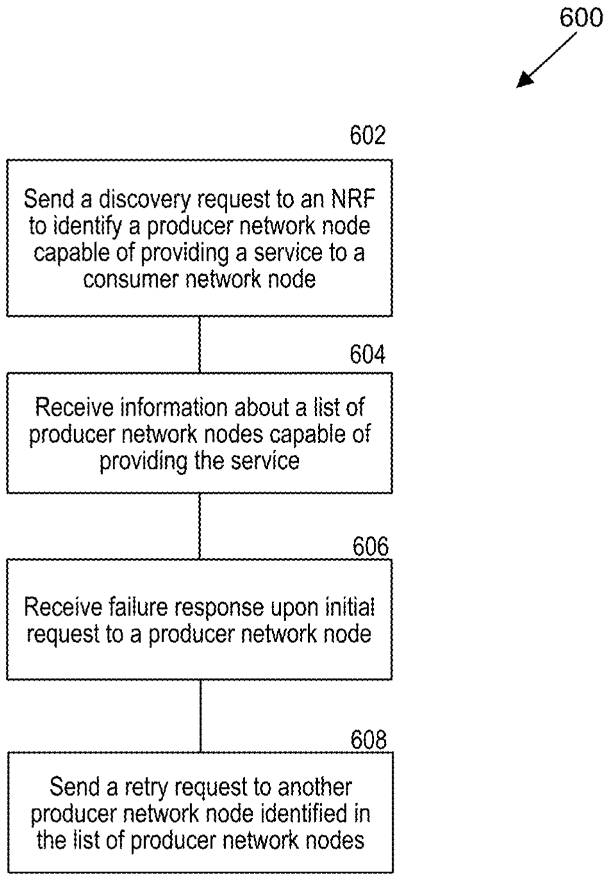
FIG. 6 is a flowchart representation of an example process for sending a retry request for service upon failure of an initial request for service by a consumer network node in accordance with one or more embodiments of the present technology.

FIG. 6 is a flowchart representation of an example process 600 for sending a retry request for service upon failure of an initial request for service by a consumer network node. At Operation 602, a consumer network node of a wireless communication network sends a discovery request to an NRF to identify a producer network node capable of providing a service. The discovery request identifies parameters defined by the consumer network node and can include information of the service request by the consumer network node, locality information associated with the consumer network node, or network slice information associated with the consumer network node. The consumer network node can be any network node in the wireless communication network that can communicate with and make a service request to other network nodes in the wireless communication network.

At Operation 604, the consumer network node receives information from the NRF about a list of producer network nodes capable of providing the service to the consumer network node. The list can include multiple producer network nodes capable of providing the service, a number of instances associated with each of the producer network nodes, and the retry order identifying an order of retrying a request for service upon failure of an initial request for service.

At Operation 606, the consumer network node, after sending an initial request to a producer network node identified in the information received from the NRF, receives a failure response. Failure can be due to various reasons, including, but not limited to, errors associated with the producer network node, problems with the initial request due to errors such as incorrect syntax or absence of permission, and/or problems associated with the wireless communication network.

Upon failure of an initial request for service, the consumer network node, at Operation 608, sends a retry request to another producer network node identified in the list of producer network nodes. The list of producer network nodes can include a retry order associated with each producer network node in the list such that the consumer network node is enabled to determine a next preferred producer network node to retry the request to upon failure of an initial request.

In some implementations, the list further includes network node group information associated with each of the producer network nodes. The producer network nodes can be categorized into different network node groups based on factors including, but not limited to, latency information, capacity information, and/or geo-location information associated with the producer network nodes.

In some implementations, at any point during the signaling sequence 300, the NRF receives an indication that a producer network node included in the list of the producer network nodes is unavailable. Upon receiving the indication, the NRF updates the list of the producer network nodes to reflect producer network nodes that are available. The NRF can send the updated list of the producer network nodes to the consumer network node.

Computer System

Figure 7:
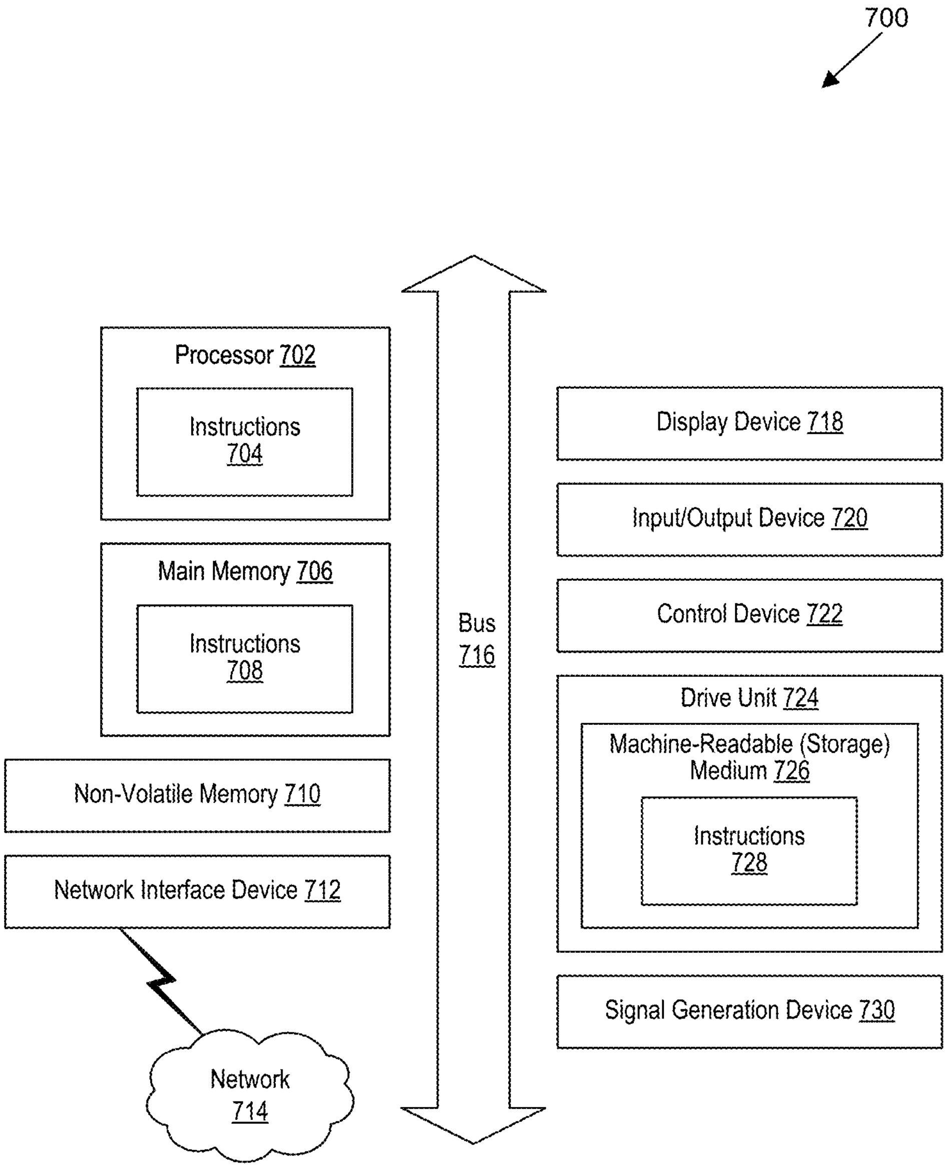
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A method for telecommunication, comprising:

receiving, by a network repository function (NRF) of a wireless communication network, a discovery request from a consumer network node to identify a producer network node capable of providing a service to the consumer network node, wherein the discovery request identifies one or more parameters specified by the consumer network node, wherein the one or more parameters include at least one of: information of the service requested by the consumer network node, locality information associated with the consumer network node, or network slice information associated with the consumer network node; and sending, by the NRF, information about a list of producer network nodes capable of providing the service to the consumer network node with a retry order specifying an order of the producer network nodes for retrying a service request upon a failure of an initial service request, wherein the order of the producer network nodes is determined based on at least a latency associated with each of the producer network nodes, wherein the list of the producer network nodes further includes network node group information and retry order group information associated with the producer network nodes, wherein the producer network nodes are divided into network node groups based at least on the latency associated with each of the producer network nodes, and wherein the retry order group information identifies a retry order including at least one producer network node to retry the service request upon a failure of the initial service request.

2. The method of claim 1, further comprising:

accessing, by the NRF, a database storing profiles of network nodes in the wireless communication network; and identifying producer network nodes capable of providing the service to the consumer network node.

3. The method of claim 1, wherein the consumer network node is a session management function (SMF).

4. The method of claim 3, wherein the producer network nodes are policy control functions (PCFs).

5. The method of claim 3, wherein the producer network nodes are charging functions (CHFs).

6. The method of claim 1, wherein the retry order is further determined based on at least one of: capacity information or geo-location information of the producer network nodes.

7. The method of claim 1, further comprising:

receiving, by the NRF, an indication that a producer network node included in the list of the producer network nodes capable of providing the service to the consumer network node is unavailable;

based on the indication, updating the list of the producer network nodes; and sending, by the NRF, the updated list of the producer network nodes to the consumer network node.

8. A method for telecommunication, comprising:

sending, by a consumer network node of a wireless communication network, a discovery request to a network repository function (NRF) to identify a producer network node capable of providing a service to the consumer network node, wherein the discovery request identifies one or more parameters specified by the consumer network node, wherein the one or more parameters include at least one of: information of a service requested by the consumer network node, locality information associated with the consumer network node, or network slice information associated with the consumer network node; and receiving, by the consumer network node, information about a list of producer network nodes capable of providing the service to the consumer network node with a retry order specifying an order of the producer network nodes for retrying a service request upon a failure of an initial service request, wherein the order of the producer network nodes is determined based on at least a latency associated with each of the producer network nodes, wherein the list of the producer network nodes further includes network node group information and retry order group information associated with the producer network nodes, wherein the producer network nodes are divided into network node groups based at least on the latency associated with each of the producer network nodes, and wherein the retry order group information identifies a retry order including at least one producer network node to retry the service request upon a failure of the initial service request.

9. The method of claim 8, wherein the consumer network node is a session management function (SMF).

10. The method of claim 9, wherein the producer network nodes are policy control functions (PCFs).

11. The method of claim 9, wherein the producer network nodes are charging functions (CHFs).

12. The method of claim 8, wherein the retry order is further determined based on at least one of: capacity information or geo-location information of the producer network nodes.

13. The method of claim 8, further comprising:

receiving, by the NRF, an indication that a producer network node included in the list of the producer network nodes capable of providing the service to the consumer network node is unavailable;

based on the indication, updating the list of the producer network nodes; and sending, by the NRF, the updated list of the producer network nodes to the consumer network node.

14. A system for retrying a request for service, the system comprising:

at least one hardware processor; and at least one non-transitory memory storing instructions, which, when executed by the at least one hardware processor, cause the system to:

send, by a consumer network node of the system, a discovery request to a network repository function (NRF) to identify a producer network node capable of providing a service to the consumer network node, wherein the discovery request identifies one or more parameters specified by the consumer network node, wherein the one or more parameters include at least one of: information of the service requested by the consumer network node, locality information associated with the consumer network node, or network slice information associated with the consumer network node;

cause the NRF to:

identify producer network nodes capable of providing the service to the consumer network node; and send information about a list of producer network nodes capable of providing the service to the consumer network node with a retry order specifying an order of the producer network nodes for retrying a service request upon a failure of an initial service request, wherein the order of the producer network nodes is determined based on at least a latency associated with each of the producer network nodes; and send, by the consumer network node, the initial service request to a producer network node identified in the list of producer network nodes; and upon failure of the initial service request, send, by the consumer network node, another service request to another producer network node based on the retry order, wherein the list of the producer network nodes further includes network node group information and retry order group information associated with the producer network nodes, wherein the producer network nodes are divided into network node groups based at least on the latency associated with each of the producer network nodes, and wherein the retry order group information identifies a retry order including at least one producer network node to retry the service request upon a failure of the initial service request.

15. The system of claim 14, wherein the consumer network node is a session management function (SMF).

16. The system of claim 14, wherein the retry order is further determined based on at least one of: capacity information or geo-location information of the producer network nodes.

17. The system of claim 14, wherein the NRF is further configured to:

receive an indication that a producer network node included in the list of the producer network nodes capable of providing the service to the consumer network node is unavailable;

based on the indication, update the list of the producer network nodes; and send the updated list of the producer network nodes to the consumer network node.

* * * * *